United States Patent [19]

Robillard

[11] 4,060,755
[45] Nov. 29, 1977

[54] MULTIPLE AXIS PATH CONTROL FOR A MANUALLY CONTROLLED MACHINE

[75] Inventor: Edward George Robillard, Cherry Valley, Mass.

[73] Assignee: Cincinnati Milacron, Inc., Cincinnati, Ohio

[21] Appl. No.: 673,467

[22] Filed: Apr. 5, 1976

[51] Int. Cl.² ............................................. G05B 19/24
[52] U.S. Cl. ..................................... 318/571; 318/39; 318/603
[58] Field of Search ..................... 318/603, 571, 39; 235/151.11

[56] References Cited

U.S. PATENT DOCUMENTS

| 3,497,780 | 2/1970 | Leenhouts | 318/603 X |
| 3,530,283 | 9/1970 | McDaniel | 318/571 X |
| 3,605,000 | 9/1971 | Inaba et al. | 318/603 X |
| 3,864,613 | 2/1975 | Cutler | 318/571 |

Primary Examiner—B. Dobeck
Attorney, Agent, or Firm—C. Richard Eby

[57] ABSTRACT

An apparatus is provided for moving a machine element along a straight line path in a plane defined by two orthogonal axes of motion. A switching device is provided for producing an input signal representing the slope of the straight line path which is defined by the tangent of the angle formed between the path and a first axis of motion. In accordance with mechanisms known in the prior art, first output pulses are generated for moving the machine element along the first axis of motion at an arbitrary velocity. The invention provides a counter circuit having a modulus as a function of the component of slope along the first axis of motion. Further in response to the input signal and each of the first output pulses, the counter circuit increments a number of times represented by the component of slope along the second axis of motion. Each time the counter circuit cycles through its modulus, a carry signal is generated which represents a second output pulse for incrementally moving the machine element along the second axis of motion.

9 Claims, 2 Drawing Figures

MULTIPLE AXIS PATH CONTROL FOR A MANUALLY CONTROLLED MACHINE

BACKGROUND OF THE INVENTION

The invention relates generally to the area of manual machine controls, and specifically the invention provides a simple two-axis linear contouring semiautomatic control for a manually controlled machine.

Machine controls can be separated into two broad categories — manual controls and numerical controls. With manual controls, a machine executes a cycle of operation in response to an operator controlling manual controls on the machine. With numerical control, a machine cycle is executed in response to a predetermined stored program. Generally, numerical control allows a machine element to move simultaneously in a plurality of axes of motion to generate a resultant vector path. Further, the velocity along the vector path is controlled. In contrast, manually controlled machines generally move each axis of motion sequentially. To move the machine along a predetermined path comprised of two or more axes of motion requires more coordination than is possessed by machine operators.

The disclosed apparatus is for use on a manually controlled machine and provides a simple inexpensive semiautomatic control for moving a machine element along a straight line path having components comprised of displacements along orthogonal axes of motion.

SUMMARY OF THE INVENTION

According to one embodiment, an apparatus is claimed for moving a machine element along a straight line path having components of slope parallel to two orthogonal axes of motion. Said apparatus produces first output pulses representing motion of the machine element along a first axis of motion in response to second output pulses representing motion of the machine element along the second orthogonal axis of motion. The apparatus includes a first means for storing an input signal representing the slope of the path by defining the tangent of the feed angle formed between the path and the second axis of motion. The apparatus further includes a second means responsive to the second output pulses for producing timing signals. Finally, the apparatus includes a counter circuit having a modulus equal to the component of slope along the second axis of motion. The counter circuit responds to the timing signals and increments a number of times corresponding to component of slope along the first axis of motion in response to each of the second output pulses. The counter circuit produces a carry pulse each time it cycles through its modulus, and each carry pulse corresponds to one of the first output pulses for moving the machine element along the first axis of motion.

DESCRIPTION OF THE PREFERRED EMBODIMENT

Figure 1:
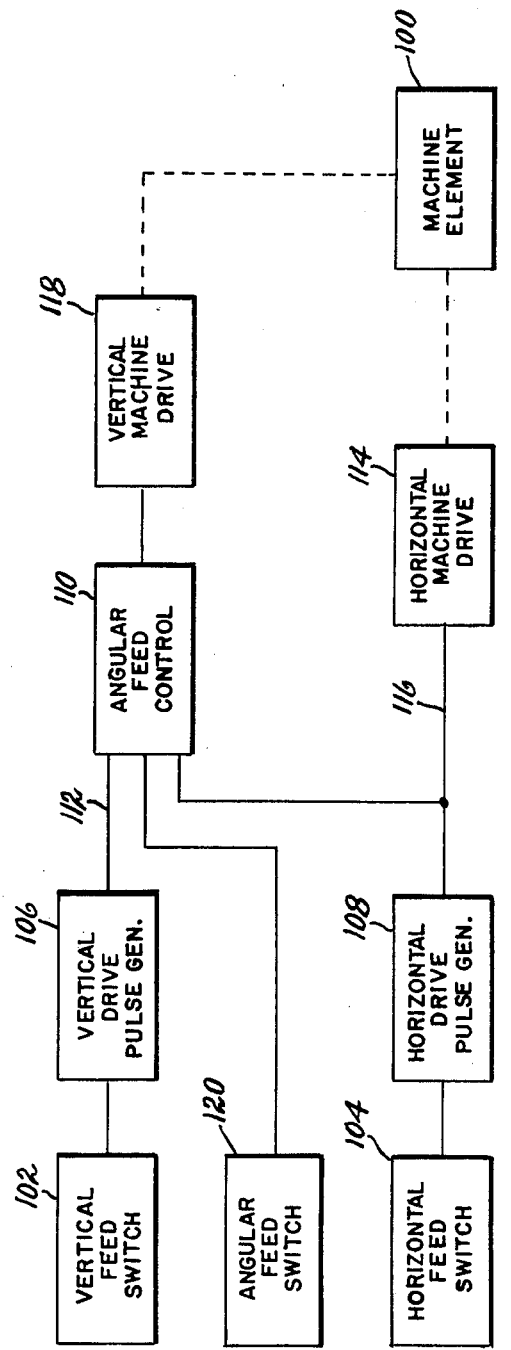
FIG. 1 is a general block diagram illustrating the invention.

FIG. 1 is a general block diagram illustrating the application of the invention. A machine element 100 is responsive to manual controls for being moved in mutually perpendicular axes of motion. A vertical feed switch 102 is used to command motion of the machine element 100 along a vertical axis of motion, and a horizontal feed switch 104 is operative to command the machine element along a horizontal axis of motion. A vertical drive pulse generator 106 and horizontal drive pulse generator 108 are responsive, respectively, to the vertical feed switch 102 and horizontal feed switch 104 for generating direction and incremental clock signals representing the commanded motion. The vertical drive pulse generator 106 produces a vertical clock signal in response to the activation of the vertical feed switch and further produces vertical clockwise or counterclockwise signals as a function of the commanded direction of vertical motion. These signals are transmitted to an angular feed control 110 via a connection 112. Similarly, the horizontal drive pulse generator produces a horizontal clock signal in response to the activation of the horizontal feed switch and horizontal clockwise or counterclockwise signals as a function of the direction of commanded motion along the horizontal axes. These signals are transmitted directly to a horizontal machine drive 114 via a connection 116. The vertical and horizontal clock signals represent a train of pulses in which each pulse commands a predetermined increment of displacement along the respective axis of motion.

When operating in a standard mode of operation, i.e. without the use of angular feed control 110, the vertical machine drive 118 is directly responsive to the vertical clock and direction signals generated by the vertical drive pulse generator 106. The machine drive circuits 114 and 118 are responsive to the clock and direction signals for energizing actuators contained therein. These actuators are mechanically coupled to the machine element and drive the machine element in accordance with the clock and direction signals received. As discussed earlier, in accordance with the manual machine control systems shown in the prior art, the feed switches are generally activated in a sequential manner to move the machine element from one position to another. To move the machine along a straight line path not parallel to the machine axes of motion requires a skill far in excess of that of the typical machine operator.

Therefore, the invention provides an angular feed switch 120 which may be used to switch the manual control into a semiautomatic angular feed control mode. In this situation, the slope of the desired path is manually preset into the angular feed control; and the horizontal feed switch is activated. The angular feed control 110 responds to the horizontal clock and direction signals to produce vertical clock and direction signals to the vertical machine drive 118. These signals cause the machine element to move in a vertical direction simultaneously with its horizontal motion thereby generating a straight line path of the preset slope.

Figure 2:
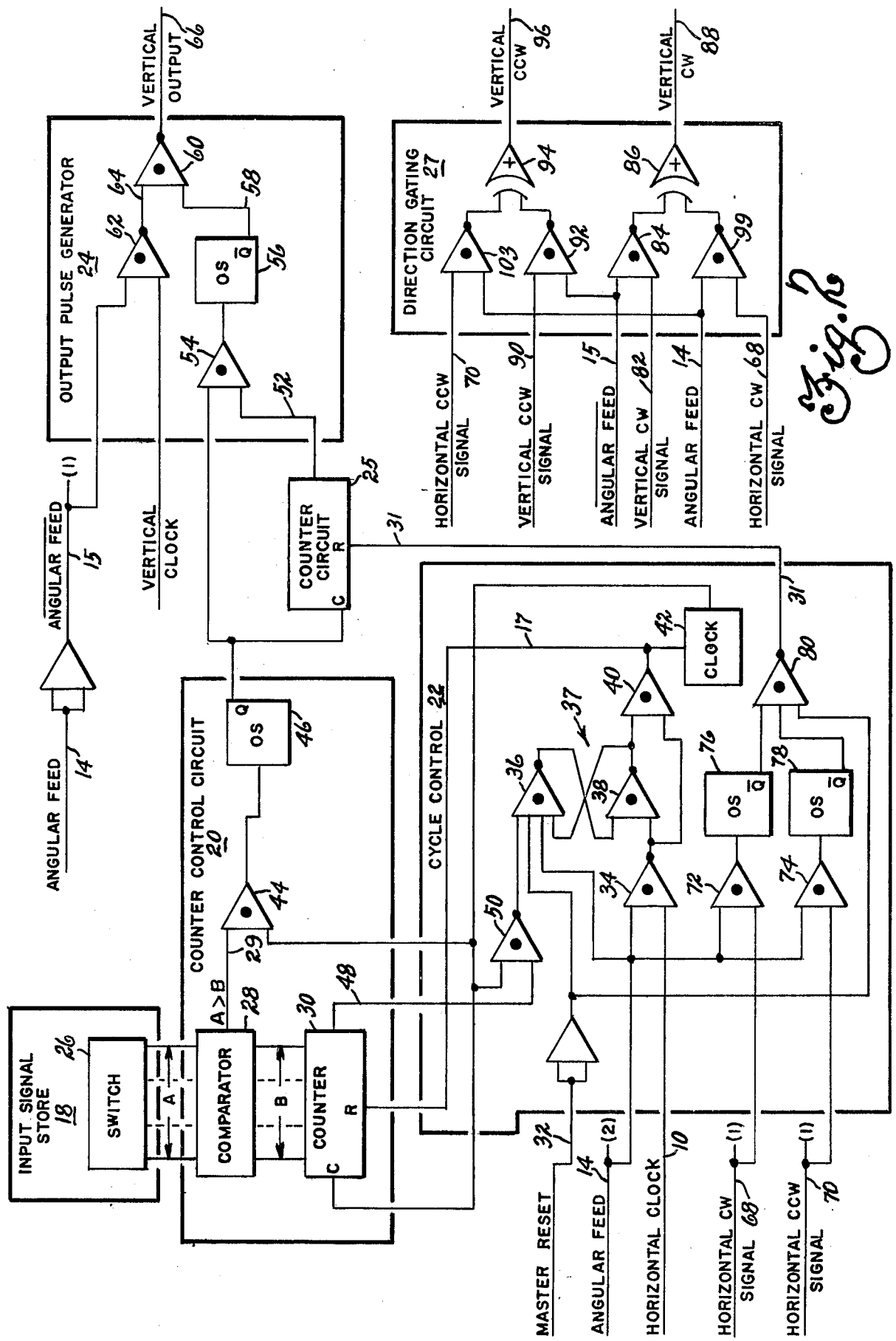
FIG. 2 is a schematic diagram illustrating the elements of the angular feed control shown in FIG. 1.

FIG. 2 is a schematic diagram illustrating the elements of the angular feed control shown in FIG. 1.

The invention is comprised of an input signal store 18, a counter control circuit 20, a cycle control 22, a counter circuit 25, an output pulse generator 24 and a direction gating circuit 27. The input signal store 18 contains means for storing the slope of the desired straight line path which is defined by the tangent of the feed angle between the desired path and the horizontal axis of motion. Conveniently, the slope can be defined such that the component of slope along the horizontal axis of motion is represented by a whole decimal order of magnitude, e.g. 100; and therefore, the input signal is defined as the component of slope along the vertical axes of motion for 100 increments of displacement along the horizontal axes of motion. The input signal store 18 may take the form of a switching device 26 which has a resolution consistent with the remainder of the machine system. Further, the switch 26 may produce an input signal in a number system compatible with the logic elements, e.g. binary, binary coded decimal, etc. Once the tangent of the feed angle has been set into the switch, the switch 26 operates as a store for this input information. Further, the switch produces this information as a continuous input signal to a comparator 28 within the counter control circuit 20. The comparator 28 has a second set of inputs connected to the outputs of a counter 30. The counter 30 has a modulus equal to the component of slope of the path parallel to the horizontal axis of motion. The comparator produces a first signal in response to the input signal being greater than a number signal in the counter 30.

A master reset signal on line 32 is operative to cause the cycle control 22 to produce a reset signal via line 17 and 31 to the counter 30 and the counter circuit 25. Therefore, initially, upon the operator switching to the angular feed mode, both of these counters contain zero magnitudes. Further, upon switching to the angular feed mode, the angular feed signal on line 14 provides the appropriate gating for the operation of the angular feed control. When in the angular feed mode, upon energizing a horizontal feed switch, a horizontal clock pulse is generated on line 10. This signal is gated with the angular feed signal on line 14 in NAND gate 34 and is operative to set a flip flop 37 comprised of NAND gates 36 and 38. An output from this flip flop passes through AND gate 40 and is operative to remove an inhibit from a clock oscillator 42.

The clock oscillator provides clock pulses to the counter 30 in the counter control circuit 20. With each clock pulse, the counter 30 increments through one of its counter states. With each increment of the counter 30 as long as the input signal from the switch 26 is greater than the number signal from the counter 30, the comparator 28 continues to produce a first signal on line 29. This first signal is one input to an AND gate 44 having a second input responsive to the output of the clock oscillator 42 on line 43. The AND gate 44 is operative to trigger a one shot or monostable multivibrator 46 which produces an output signal to the clock input of counter circuit 25. The counter circuit 25 has a modulus equal to the modulus of the counter 30. The counter circuit 25 is thereby incremented through its counter states. This process continues until the comparator determines that the input signal is equal to the number signal from the counter 30. At this point, the first signal on line 29 is terminated; and the operation of the one-shot 46 ceases. Consequently, the counter circuit 25 contains a number equal to the number represented by the input signal from the switch 26. The clock oscillator 42 continues to clock the counter 30 until it counts through its modulus and produces a carry pulse on line 48. The carry pulse is gated with the output from the clock oscillator 42 in NAND gate 50 and is operative to reset the flip flop 37 thereby applying an inhibit signal to the clock oscillator 42. The above process is repeated for each horizontal clock pulse received on the line 10.

Therefore, with each horizontal clock pulse, the counter circuit 25 increments through a magnitude equal to the input signal contained in the switch 26. This continues until the counter circuit 25 counts through its modulus thereby producing a carry signal on output line 52. The carry signal is gated with the output signal from the one-shot 46 in AND gate 54. The combination of these two signals triggers another one-shot 56 which produces an output signal on line 58 to NAND gate 60. The angular feed signal on line 14 is inverted and transmitted via line 15 to one input to a NAND gate 62 which inhibits the normal vertical clock pulse on line 12 and produces an output signal on line 64. The output signal on line 64 allows the NAND gate 60 to pass the output signal from the one-shot 56 to the output line 66 as a vertical output pulse. This vertical output pulse is input to the vertical machine drive 118 (see FIG. 1) to move the machine element in the vertical direction. Therefore, in response to each cycle of the counter circuit 25 through its modulus, a carry pulse on line 52 is gated through the output pulse generator 24 to the vertical output line 66. This process continues as long as the horizontal feed switch is held energized by the machine operator. When this control is deenergized, the horizontal clock pulses are terminated which terminates the operation of the angular feed control shown in FIG. 2.

As discussed earlier, the master reset signal on line 32 is operative to reset the counter 30 and counter circuit 25. In addition, when in the angular feed mode, these counters must be reset in response to each change in direction experienced along the horizontal axis of motion. The change in direction is monitored by a horizontal clockwise signal on line 68 and a horizontal counterclockwise signal on line 70. These signals are gated with the angular feed signal in AND gates 72 and 74, respectively, to produce corresponding reset pulses from one-shots 76 and 78. All of the reset pulses are inputs to NAND gate 80 which is connected to the reset input of the counter circuit 25 via line 31. As will be appreciated by those who are skilled in the art, the modulus of the counter 30 and counter circuit 25 are the same and further, the modulus of these counters corresponds to the component of slope along the horizontal axis of motion which may be conveniently made equal to a predetermined whole number of decimal orders of magnitude.

The discussion of FIG. 2 up to this point has been concerned with generating a vertical clock signal in the angular feed mode. This signal represents a pulse train which commands the machine element to move along the vertical axis of motion. However, the direction of motion has not been defined. It is the function of the direction gating circuit 27 to produce vertical clockwise or counterclockwise signals to define the direction of motion along the vertical axis. When not in the angular feed mode, the vertical clockwise signal on line 82 passes through NAND gate 84 and the exclusive OR 86 to provide a vertical clockwise signal on output line 88. Likewise, the vertical counterclockwise signal on line 90 passes through NAND gate 92 and the exclusive OR 94 to provide a vertical counterclockwise signal on output line 96. However, when in the angular feed mode of operation, the vertical feed switches are not used; and the direction of motion along the vertical axis must be derived from the operation of the horizontal feed switches. Therefore, when in the angular feed mode, the vertical clockwise and counterclockwise signals on lines 84 and 90 respectively are disabled. The horizontal clockwise signal on line 68 passes through NAND gate 99 and the exclusive OR gate 86 to provide a vertical clockwise signal on the output line 88. Further, the horizontal counterclockwise signal on line 70 passes through NAND gate 103 and exclusive OR gate 94 to provide a vertical counterclockwise signal on line 96.

While the invention has been illustrated in some detail according to the preferred embodiment shown in the accompanying drawings, and while the preferred illustrated embodiment has been described in some detail there is no intention to limit the invention to such detail. On the contrary, it is intended to cover all modifications, alterations and equivalents falling within the spirit and scope of the appended claims.

What is claimed is:

1. An apparatus for producing first clock and direction signals for feeding a machine element along a first axis of motion in response to second clock and direction signals for feeding the machine element along a second orthogonal axis of motion, said first and second clock and direction signals being operative to move the machine element along a straight line path having a slope defined by a feed angle formed between the path and the second axis of motion, the apparatus comprising:
   a. means for storing an input signal representing the tangent of the feed angle;
   b. means responsive to each pulse in the second clock signal for producing timing signals;
   c. a counter means responsive to the input signal and the timing signals for accumulating in response to each pulse in the second clock signal a number equal to the tangent of the feed angle, and said counter means producing a carry pulse in response to the counter accumulations exceeding the counter modulus whereby the carry pulse represents a pulse in the first clock signal.

2. The apparatus of claim 1, wherein the storing means comprises a selector switch for producing the input signal representing the tangent of the feed angle, said tangent being defined by the ratio of the component of slope parallel to the first axis of motion to the component of slope parallel to the second axis of motion.

3. The apparatus of claim 2, wherein the counter means further comprises:
   a. a first counter circuit having a modulus equal to the component of slope along the second axis of motion;
   b. means responsive to the timing signals and the input signal and connected to the first counter circuit for causing the first counter circuit to increment through a number of counts representing the component of slope parallel to the first axis of motion in response to each pulse in the second clock signal; and
   c. means responsive to the first counter circuit for producing a pulse in the first clock signal in response to each cycle of the first counter circuit through its modulus.

4. The apparatus of claim 3, wherein the means for producing timing signals further comprises:
   a. a clock oscillator circuit for producing clock pulses;
   b. means having a first input responsive to the second clock signal, a second input and an output connected to the clock oscillator circuit for generating a number of clock pulses in response to each pulse of the second clock signal.

5. The apparatus of claim 4, wherein the causing means further comprises:
   a. a second counter circuit responsive to the clock pulses and having a modulus equal to the modulus of the first counter circuit, said second counter circuit incrementing one count in response to each clock pulse to produce a number signal and producing a carry signal to the second input of the generating means to terminate the supply of clock pulses from the oscillator circuit in response to the number signal exceeding the counter modulus;
   b. a comparator circuit responsive to the input signal and the number signal for producing a first signal in response to the input signal exceeding the number signal; and
   c. means responsive to the clock pulses and the first signal for incrementing the first counter circuit an amount equal to the component of slope parallel to the first axis of motion in response to the first signal.

6. The apparatus of claim 5, wherein the apparatus further comprises gating circuits responsive to the second direction signals for producing the first direction signals.

7. The apparatus of claim 6, wherein the tangent of the feed angle is defined by a fraction having a denominator equal to the component of slope parallel to the second axis of motion and being expressed as a predetermined whole number of decimal orders of magnitude and a numerator equal to the component of slope parallel to the first axis of motion resulting from a displacement parallel to second axis of motion equal to the predetermined whole number of decimal orders of magnitude.

8. The apparatus of claim 7, wherein the modulus of the first and second counters is equal to the predetermined whole number of decimal orders of magnitude.

9. The apparatus of claim 8, wherein the denominator of the fraction defining the tangent of the feed angle and the modulus of the first and second counters is equal to 100.

* * * * *